United States Patent [19]

Metz et al.

[11] 4,115,089
[45] Sep. 19, 1978

[54] PROCESS AND APPARATUS FOR MAKING EXPANDED SLAG

[75] Inventors: Paul Metz, Luxembourg; Robert Schockmel, Esch, Alzette; Désiré Nick, Differdange; Paul Pfeiffer, Esch, Alzette, all of Luxembourg

[73] Assignee: Acieries Reunies de Burbach-Eich-Dudelange S.A. Arbed, Luxembourg, Luxembourg

[21] Appl. No.: 734,553

[22] Filed: Oct. 21, 1976

[30] Foreign Application Priority Data

Oct. 21, 1975 [LU] Luxembourg ............ 73623

[51] Int. Cl.² ........................... C03B 19/10
[52] U.S. Cl. ........................ 65/19; 65/1;
65/141; 65/142; 264/8; 264/15; 425/8
[58] Field of Search ........... 65/19, 21, 141, 142;
264/8, 9, 15; 425/6, 8

[56] References Cited

U.S. PATENT DOCUMENTS

| 1,047,370 | 12/1912 | Bergquist | 65/19 |
| 2,210,999 | 8/1940 | Bartholomew | 65/141 X |
| 3,104,164 | 9/1963 | Osborne | 65/141 X |
| 3,594,142 | 7/1971 | Margessen et al. | 65/19 |
| 3,833,354 | 9/1974 | Thümmler et al. | 65/19 X |

Primary Examiner—Robert L. Lindsay, Jr.
Attorney, Agent, or Firm—Karl F. Ross

[57] ABSTRACT

Expanded slag, especially blast-furnace slag of Thomas melts is made by passing the slag along a trough in which water is fed into a layer of the molten slag. The slag is then permitted to cascade downwardly along an inclined surface which is wetted with water and finally is dispersed by a rotating disintegration drum and curtain of finely divided water. The expanded slag has a lower density, a more complete expansion characteristic and a greater uniformity than conventionally produced expanded slags.

3 Claims, 3 Drawing Figures

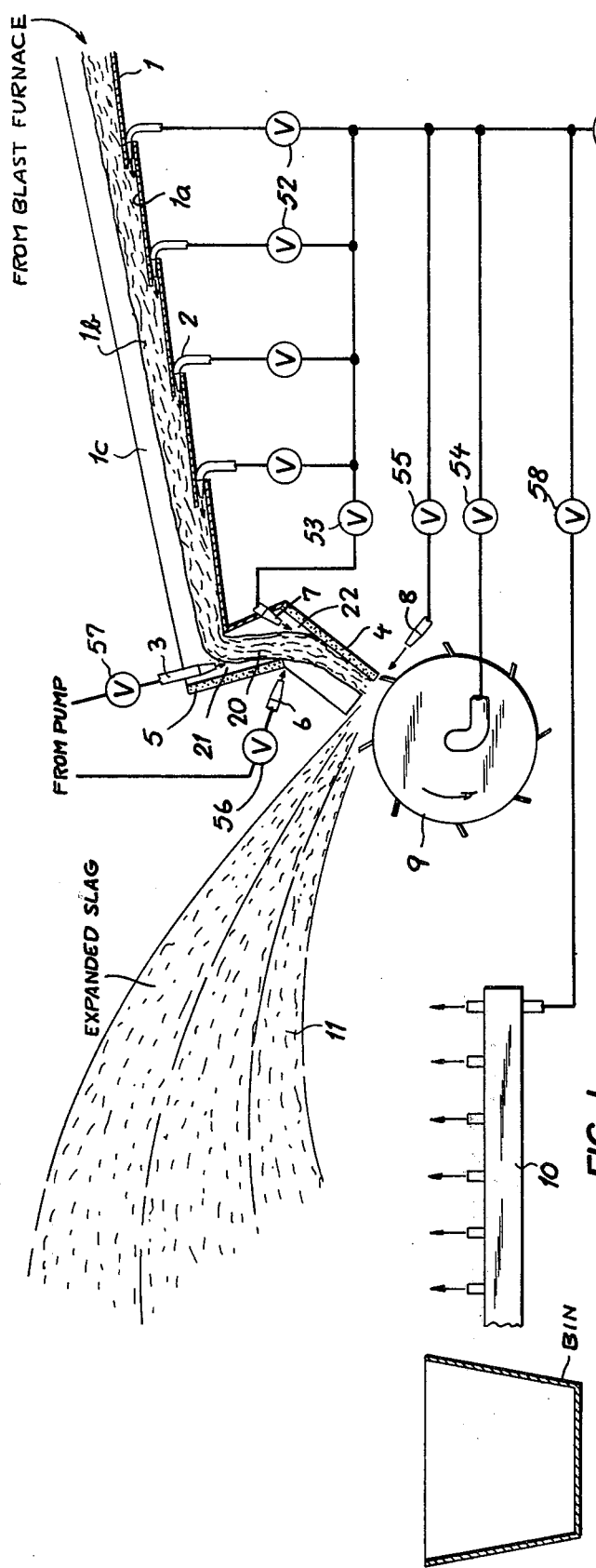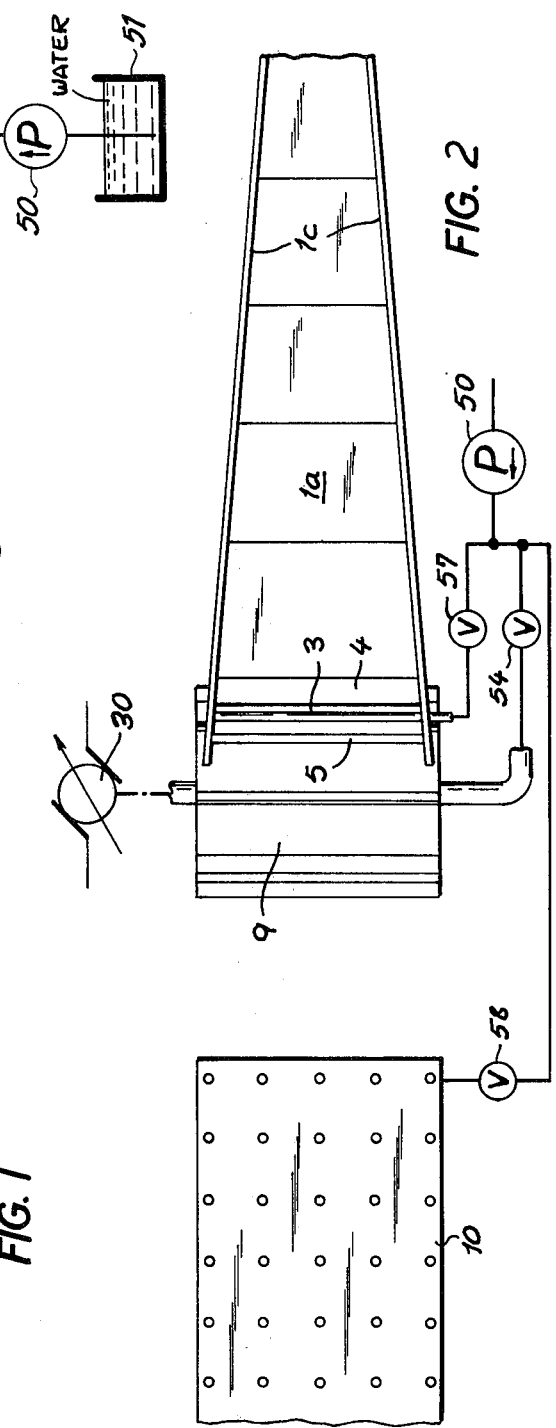

PROCESS AND APPARATUS FOR MAKING EXPANDED SLAG

FIELD OF THE INVENTION

The present invention relates to a process for producing expanded slags and, more particularly, to a process and apparatus for expanding basic slags such as the slag of Thomas melts.

BACKGROUND OF THE INVENTION

Expanded slags made by expansion of blast furnace slages have considerable utility as aggregates in the making of concrete, as components which are added to other minerals in the fabrication of cement, as fillers and the like for a wide variety of compositions and processes and for many other purposes.

There are generally three conventional processes for the making of expanded slags which are described, for example, at pages 247 ff of THE MAKING, SHAPING AND TREATING OF STEEL, U.S. Steel Company, 9th Edition, 1971, these processes yielding a porous product of low density.

In a first process, which can be described as free expansion, the slag passes along an inclined surface over a layer of water. This process has not been found to be practical except with easily expanded slags such as very hot high-silica or siliceous slags.

A second process, which can be described as semiforced expansion, requires the use of mechanical means to increase the intensity of contact of gas, such as steam, with the slag and hence the development of expansion.

Finally, we can mention forced expansion where water vapor under pressure is forced through a layer of slag, for example, in a ladle or other receptacle having a bottom which is perforated or otherwise provided with means for injecting water or water vapor into the slag.

The last two processes have been found to be difficult to carry out and delicate from the point of view of the uniformity of the product produced. Even slight changes in the parameters of the expansion operation can result in wide variation in the porosity and homogeneity of the expanded slag.

There is known a semiforced expansion which involves the use of a vaned or finned drum to subdivide the slag and whereby a jet of slag is permitted to cascase onto the drum and water is directed against this jet by the drum.

The drum serves to subdivide the pyroplastic mass of the slag into small particles which travel through the air and are solidified by cooling therein. The homogeneity of the product obtained by this process is poor and attempts to use such disintegrating drums with or without bucket wheels or the like for subdividing the slag also proved to be ineffective.

In general, the prior art techniques for the expansion of slag have been found to be incapable of obtaining sufficient expansion, especially when the slag has a high degree of basicity or low temperature. Thus they have not been found to be practical with the slag of Thomas melts.

OBJECTS OF THE INVENTION

It is an object of the present invention to provide an improved process for producing expanded slag whereby the aforementioned disadvantages are avoided.

Another object of the invention is to provide a low-cost, rapid process for producing expanded slag of high quality from the slags of Thomas melts which can have high degrees of basicity and relatively low temperature.

It is also an object of the invention to provide an improved apparatus which produces an expanded slag.

SUMMARY OF THE INVENTION

These objects and other which will become apparent hereinafter are attained, in accordance with the present invention by a process which involves three distinct stages carried out in succession and which has proved to be particularly effective to provide maximum expansion and high porosity for slags which have not been expandable heretofore or have been expandable only with difficulty, namely, with the slags of Thomas melts having a temperature below about 1475° C. and a degree of basicity greater than 1.25 (see page 340 of THE MAKING, SHAPING AND TREATING OF STEEL, op. cit.).

According to the invention, the molten slag is first subject to free preexpansion by passing the slag downwardly along a ramp or in a trough while supplying water between the floor of the ramp and the slag so that the preexpansion is substantially continuous and of the free-expansion type described above.

The second expansion stage is effected by causing the slag, at the end of the aforementioned trough, to cascade downwardly onto at least one water-wetted plate inclined to the vertical while feeding water to the region between the cascade of slag and the plate, and onto the exterior surface of the slag layer substantially over its entire width.

In the third stage, this cascading slag is subjected to drum disintegration and the particles of slag are cast into a curtain of pulverized (atomized) water which effects the congealing or solidification of the slag particles or droplets.

It has been found, most surprisingly, that this sequence of steps yields a highly uniform and maximally expanded slag, even with slags of Thomas melts of high basicity and low temperature which have not been considered expandable heretofore.

According to a feature of the invention, confronting the first mentioned inclined plate, there is provided a second plate which defines a gap with the first plate traversed by the stream of slag and any water of expansion entrained therewith. This second plate is preferably inclined in a direction opposite the direction of inclination of the first plate and has its lower edge spaced above the surface of the first plate which intercepts the stream of slag. As a result, a turbulent movement is imparted to the slag in the gap between the two plates and ahead of this gap to increase the degree of contact between the layer of slag and the water.

The improved expansion of the present invention can be attributed to the combined action of the two preexpansion faces and the mechanical disintegration technique which follows them. The initial face creates a starting preexpansion which is intensified as the layer of slag flows onto the above-mentioned plate. The final stage accomplishes a finishing expansion at the conclusion of which, at the ends of the respective trajectory, the particles of the pyroplastic slag are passed through a milieu of pulverized water in which the final solidification of the cellular particles takes place.

Best results are obtained when the chute into which the slag is initially introduced is located immediately at the foot of the blast furnace so that the melt does not lose additional heat in transport to a central expansion facility. This is particularly important with slags of Thomas melts. For slags which are more readily expandable, it is possible to use a central expansion facility in which case the entire length of the trough transporting the slag to the central drum disintegrator can be provided with inlets for water to effect the present expansion. The cascading expansion on carbon plates can be effected in the region of the central disintegrator. The resulting product is thus highly uniform and of high quality without detrimental effects resulting from the temperature differential over the transport path and the associated tendency for the viscosity to be increased thereover.

Since the quality of the slag will depend, for each particular slag composition, upon the amounts of water contacted with the slag at the various stages, we advantageously provide means for controlling the water feed rates at each significant point in the system.

BRIEF DESCRIPTION OF THE DRAWING

The above and other objects, features and advantages of the present invention will become more readily apparent from the following description, reference being made to the accompanying drawing in which:

FIG. 1 is a diagrammatic vertical section through a system for producing expanded slag according to the invention;

FIG. 2 is a plan view thereof; and

SPECIFIC DESCRIPTION

Figure 3:
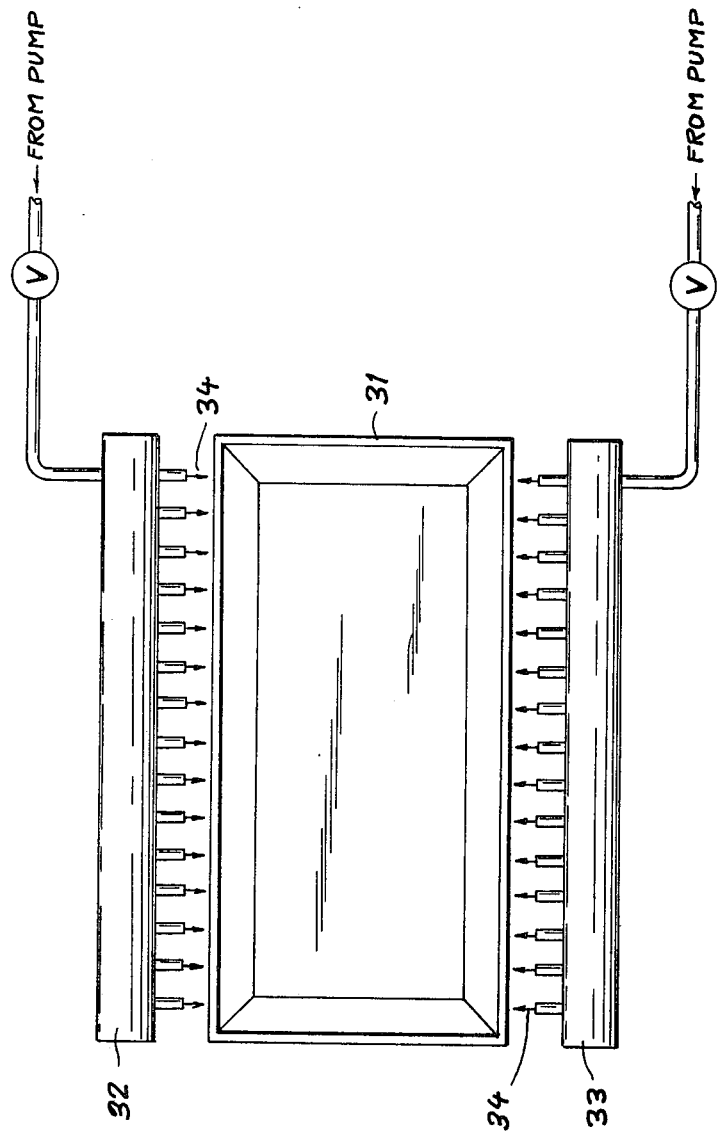
FIG. 3 is a plan view illustrating another embodiment of the discharge sides of the system of FIG. 1.

In the drawing we have shown a device for the expansion of blast-furnace slag which comprises a chute which can be disposed directly at the slag tap of the blast furnace and which can run therefrom toward a central receptacle for collecting the expanded slag.

The chute or channel 1 is provided with a bottom 1a formed with inlets 2 for water, the inlets 2 introducing the water in the direction of flow of the slag 1b so that a layer of the latter flows over a film of water covering the bottom 1a of the duct.

The channel 1 is formed from sheet steel and has a pair of lateral walls 1c which diverge (see FIG. 2) toward the lower discharge end of the chute. The channel 1 can have a width at its upstream end of about 25 mm and a width of about 35 mm at its downstream end. The depth of the slag layer can be about 15 cm and hence the chute should have a depth slightly exceeding this value. The length of the chute is 2 to 5 meters and it is inclined at an angle of 15° to 45° to the horizontal.

Free expansion of the slag layer takes place along the channel 1, the water being injected at spaced locations along its length at a rate, over the entire channel, corresponding to 0.1 to 0.3 m³ per ton of slag.

The channel 1 terminates above the carbon plate 4 inclined downwardly, preferably at an angle of 45° and 65° to the horizontal, the plate 4 intercepting the downward stream 20 of the slag. The free surface of the cascade of slags is limited by another plate 5, inclined in the opposite direction at an angle of, say, 70° to 85° to the horizontal. Water is caused to flow into the downwardly converging gap 21 between the plate 5 and the outer surface of the cascade of slag 20 from nozzles 3 under pressure at a rate of 0.1 to 0.3 m³ of water per ton of slag. Similarly, the plate 4 is wetted by a stream of water at a rate of 0.1 to 0.3 m³ per ton, introduced through nozzle 7 into the gap 22 between the plate 4 and the cascade of slag.

A larger quantity of water, ranging up to 5.0 m³ per hour, can be directed by nozzles 6 against the free surface of the slag layer as it is guided by the plate 4 just below the plate 5. The nozzles 3, 6 and 7 and the water inlets 2 can extend the full width of the stream of slag with which the water is contacted.

Below the plate 4 there is disposed a disintegration drum 9 constituted by a bucket drum rotated in the clockwise sense in FIG. 1 and having a diameter of 84 cm with eight axially extending vanes or buckets which cast the slag stream as particles 11 through a curtain of finely divided water, e.g. a mist produced by a nozzle system 10. The drum 9 can be cooled by circulating water which can be supplied and withdrawn from opposite ends of the drum along the axis thereof. About 0.5 m³ per hour of water is permitted to pass through the drum via perforations therein or through gaps between the buckets and vanes, this trickle of water maintaining the surface of the drum wetted with water. The drum is rotated at a variable speed between 100 and 500 rpm, the granulometry of the expanded slag varying as a function of the speed of the drum. More finely divided particles can be obtained at higher speed and hence we prefer means, e.g. a variable speed motor 30 for driving the drum at the variable speeds.

It has been found to be advantageous to direct jets of water from nozzles 8 across the full width of the slag layer from behind as shown by the nozzle 8 at a rate of up to 5 m³ per hour. These jets are trained upon the line of impact of the slag with the drum and can be the quantity of water necessary for the finishing expansion of the slag. The particles 11 traversing the mist can be collected in a receptacle.

As can be seen from FIG. 3, the receptacle 31 can be disposed between two planar arrays of nozzles 32 and 33 lying in vertical planes flanking the receptacle 31 so that a curtain of atomized water 34 fills the space between the nozzle arrays 32 and 33, the particles of solidifying slag encountering the next droplets over about one-third to two-thirds of their trajectory from the drum and especially the latter part of their trajectories. The sprays from these jets can supply up to 5 m³ per hour of water. The congealed or solidified particles gather in the receptacle.

In the above example, it was found to be possible to expand a slag from a Thomas melt consisting of approximately 45% by weight calcium oxide, 33% by weight silica, 3.5% by weight magnesia, 15% by weight $Al_2O_3$ and 1.36% by weight $CaO/SiO_2$ at a temperature between 1410° and 1416° C. to obtain one ton of expanded slag per minute in the form of homogenous material with a density between 0.3 and 0.7 grams per cm³ with an alveolar structure and a color ranging from yellow to light gray. The amount of granulated slag and of incompletely expanded or nonexpanded slag in the product was negligible and the amount of water used was 0.6 to 0.8 m³ per ton of expanded slag.

A pump 50 draws the water from a source 51 and feeds it via the valves 52 to the inlets 2 along the floor of the trough 1, via the valve 53 to the inlet 7 for the gap between the first plate 4 and the cascade of slag, to the valve 54 controlling the supply of water to the drum 9, to the valve 55 feeding the jet 8, to the valve 56 feeding the nozzles 6, to the valve 57 feeding the nozzles 3, and to the valve 58 feeding the mist sprayers 10. The valves permit control of the quantity of water to obtain the desired levels of wetting of the slag.

We claim:

1. An apparatus for the expanding of slag comprising:
   (a) a downwardly widening chute inclined to the horizontal and receiving said slag at its upper end and discharging slag in a cascade at its lower end;
   (b) a plurality of inlet slots formed along the floor of said chute for introducing streams of water over the width thereof in the direction of flow of said slag along said floor;
   (c) a first plate disposed below said lower end of said chute and intercepting said cascade, said first plate being inclined to the horizontal and including a first gap with said cascade;
   (d) means for introducing water into said first gap;
   (e) a second plate inclined to the horizontal in a direction opposite the inclination of said first plate and including a second gap with a surface of said cascade opposite said first plate;
   (f) means for introducing water into said second gap;
   (g) a rotary disintegrating drum disposed below said first plate and receiving a stream of slag therefrom, said stream of slag from said first plate impinging upon said drum along a line;
   (h) means for wetting the surface of said drum contacted by the slag;
   (i) means for rotating said drum to cast slag therefrom as particles along respective trajectories;
   (j) means for directing water against said line;
   (k) a receptacle for collecting particles of slag projected along said trajectories; and
   (l) a pair of sprayers flanking said receptacle and forming a mist of water along the last one third to two thirds of said trajectories for contact of said particles with said mist.

2. The apparatus defined in claim 1, further comprising control means for regulating each flow of water.

3. A process for producing an expanded slag which comprises the steps of:
   (a) passing molten slag downwardly along an inclined channel while supplying water between the slag and the floor of said channel to preexpand said slag;
   (b) cascading a stream of slag from the lower end of said channel downwardly;
   (c) intercepting the cascade of slag with a surface of a plate inclined to the horizontal, and wetting said surface to further expand said slag;
   (d) generating a water curtain in the form of a mist across a space between arrays of atomizing nozzles between said surface and a slag-collecting bin;
   (e) disintegrating the streams of further expanded slag by depositing same upon a rotating drum to disperse the further expanded slag as particles adjacent said surface;
   (f) hurling said particles of slag projected from said drum through said mist of water and into said collecting bin;
   (g) directing water against a surface of the cascade of slag opposite said plate;
   (h) directing water against said drum along a line upon which said slag impinges upon said drum;
   (i) confining said cascade between said surface of said plate and an oppositely inclined surface of a second plate juxtaposed with said cascade and forming a gap with the first plate traversed by the said cascade, said second plate forming a gap converging in the direction of flow of said slag toward said slag; and
   (j) introducing water into the last-mentioned gap.

* * * * *